(No Model.)
S. T. PERCY.
DUST PAN.
No. 572,180. Patented Dec. 1, 1896.
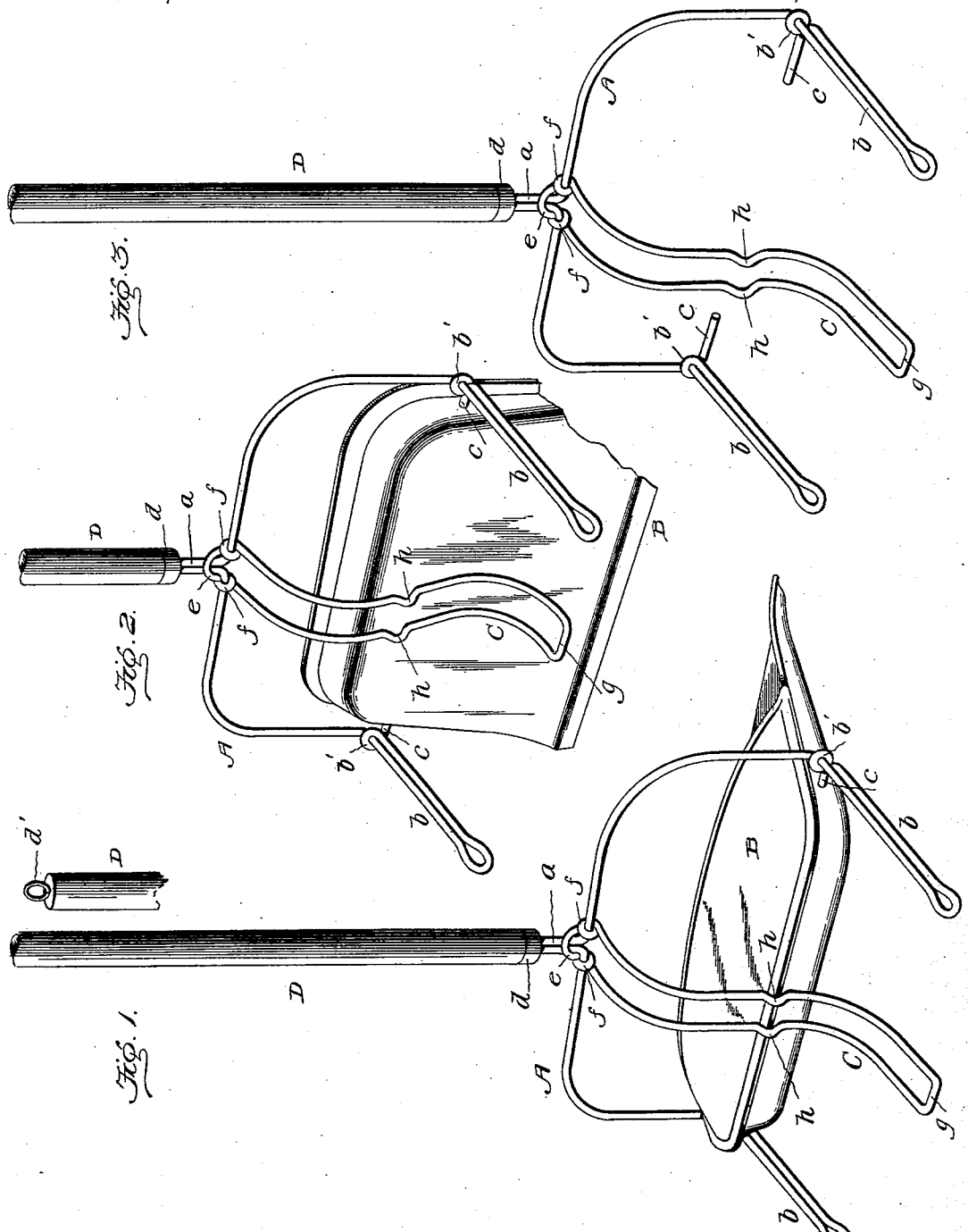
Witnesses:
S. T. Percy
Inventor
By Edson Bros.
Atty's

UNITED STATES PATENT OFFICE.

SYLVANUS T. PERCY, OF PORT HURON, MICHIGAN, ASSIGNOR, BY MESNE ASSIGNMENTS, TO WALTER J. HOPKINS, OF ST. CLAIR, MICHIGAN.

DUST-PAN.

SPECIFICATION forming part of Letters Patent No. 572,180, dated December 1, 1896.

Application filed January 15, 1896. Serial No. 575,628. (No model.)

*To all whom it may concern:*

Be it known that I, SYLVANUS T. PERCY, a citizen of the United States, residing at Port Huron, in the county of St. Clair and State of Michigan, have invented certain new and useful Improvements in Dust-Pans; and I do hereby declare the following to be a full, clear, and exact description of the invention, such as will enable others skilled in the art to which it appertains to make and use the same.

This invention relates to improvements in dust-pans; and the object that I have in view is to provide a simple and inexpensive contrivance which can be held in position without requiring the user to stoop down to sweep the dust in the pan, which can be easily dumped or inverted to empty the pan of its contents, and which can be compactly folded together when it is desired to suspend the implement.

With these and such other ends in view as pertain to a device of this character the invention consists in the novel combination of devices and in the construction and arrangement of parts which will be hereinafter described and claimed.

To enable others to understand my invention, I have illustrated the preferred embodiment thereof in the accompanying drawings, forming a part of this specification, in which—

Figure 1 is a perspective view showing the improved dust-pan adjusted for use. Fig. 2 is a perspective view of the device with the pan in its dumped or folded position. Fig. 3 is a perspective view with the pan detached from the bail and locking foot-piece.

Like letters of reference denote corresponding parts in all the figures of the drawings, referring to which—

A designates the bail or hanger, B is the pan, and C is the locking foot-piece, all combined and arranged to form a dumping dust-pan in accordance with my invention.

The bail A is bent from a single piece of wire of such strength as is necessary to give it the necessary strength and rigidity. The middle part of the wire bail is bent or doubled and twisted together to produce a shank $a$, and the ends of the wire are bent or doubled upon themselves to form the feet $b$ and the trunnions or pivots $c$. Each doubled end of the wire which forms one foot is bent or looped, as at $b'$, around the wire bail at the point where the foot branches from the bail, in order to strengthen the union at the point where the bail and foot are joined. The feet $b$ incline at an angle backwardly from the bail, so that they terminate about on a line with the back edge of the pan, and said legs extend for a distance somewhat below the bottom of the pan, so that the bail or hanger and the feet operate to support the pan B in an inclined position, which is most suitable for sweeping the dust into the pan The trunnions or pivots $c$ extend inwardly from the bail or hanger at the points where the feet $b$ branch from said hanger, and said trunnions are fitted in the openings $c'$ in the side walls of the pan and in rear of the center of gravity thereof, whereby the pan is adapted to tilt forward instead of backward.

The shank $a$ of the bail or hanger is inserted in the end of a suitable staff or handle D. This staff has a ferrule $d$ to prevent splitting of the wood at the end where the shank $a$ is secured thereto, and to the upper end of the staff is secured an eye or hook $d'$, by which the implement may be suspended from a hook or nail driven in the wall.

In order to hold the pan B securely in its inclined position when adjusted for service when sweeping into the same and to provide convenient means for dumping the pan without stooping down, I have provided the locking and releasing piece C. This piece C is, like the bail or hanger A, preferably bent from a single piece of wire in the form more clearly shown by Fig. 3 of the drawings. The piece C is bent at one end to form the loop $e$ between the two eyes $f\,f$, and its other end is bent outwardly or reversely to provide the foot $g$, the piece C being further provided with the notches $h$ at an intermediate point of its length. Said locking-piece C is fitted on the middle part of the bail or hanger A, so as to turn thereon, by having the bail passed through the eyes $f\,f$ of the piece C; but the loop $e$ is arranged to fit around the shank $a$ of said bail, whereby the loop and shank $a$ serve to prevent the locking-piece C from sliding out of position, and the loop $e$ serves as a stop to limit the turning movement of the locking-piece C on the bail when said piece C is turned in one direction. This locking-piece C curves or inclines backwardly from the bail or hanger to bring the piece in such position that the rear edge or bead on the closed end of the pan B is adapted to take or fit into the notches $h$ of the locking-piece C when the pan is adjusted for use, as in Fig. 1; and the bail A and pan B are so proportioned that the closed end of the pan can swing clear of the bail when the pan is to be dumped or tilted to empty its contents. The lower outwardly-extended end or foot-piece $g$ of the locking-piece C is arranged on a level with the feet $b$ of the bail; but this end $g$ extends in rear of the pan for a suitable distance to enable the user to dump the pan by tilting it back on the foot C and pressing on the handle.

To hang up the dust-pan, the free end of the locking-piece C, which is made of elastic or spring wire, is pressed far enough away from the rear edge of the pan to allow the pan to drop down into a vertical position within the bail, which position it will assume by gravity when released from the locking-piece, because the pan is hung eccentrically on the trunnions $c$ of the bail or hanger. At the same time the piece C will fold down against the rear side of the pan. The pan and piece C are thus compactly disposed with relation to the hanger, and the contrivance can be hung up on a nail without having the pan stand out at an angle to the wall.

To adjust the contrivance for use, the pan B is turned up toward a horizontal position, so as to have its rear edge ride against the curved upper end of the locking-piece, and this movement is continued until the rear edge of the pan springs into the notches or offsets $h$, whereby the locking-piece is engaged with the pan to hold it securely in position. During the turning movement of the pan to bring it to operative position the loop $e$ of the piece C is pressed against the shank $a$ to limit the movement of said piece C in one direction and to hold it in place while it is in engagement with the pan.

The pan can be adjusted for use, dumped, or folded together without requiring the operator to stoop down or without touching the locking or releasing piece C by the hands.

To use the pan, the operator rests the front of the pan on the floor and brings the handle forward gently until the pan catches in the notch in the piece C, when it is ready for use. The feet $b\ b$ and the front edge of the pan rest on the floor, and while sweeping the dust into the pan the operator grasps and holds the staff, and the hanger or bail, with the feet $b$ on the floor, serves to support or hold the pan in its proper place. To dump the pan, the implement is tilted and the staff is brought backward until the foot $g$ of the piece C rests firmly on the floor and the two feet $b$ of the bail are raised about as much above the floor. Then a gentle pressure on the back support will allow the pan to fall forward out of the notch in the locking-piece C.

The pan, with its load, can easily be carried without danger of spilling the dirt, and the pan can be readily dumped in the manner described. The pan falls forward because it is hung at a point back of its center, and the parts fold together compactly for readily hanging the implement on the wall.

The improved dust-pan is quite simple and durable in construction, is easily adjusted, folds compactly together for suspension on a wall, and is susceptible of manufacture at a low cost.

I disclaim connecting the notched locking device to the bail in any but the hinged or flexible manner pointed out in the foregoing specification.

What I claim, and desire to secure by Letters Patent, is—

1. A dust-pan comprising a hanger, a pan pivoted eccentrically within the hanger, and a locking-piece pivoted to the hanger and extending rearwardly therefrom to engage with the rear edge of said pan and forming a foot to rest upon the floor, substantially as described.

2. The combination with a hanger, and a dumping-pan pivoted therein, of a locking device pivoted at one end to the hanger and provided at its other end with a foot adapted to rest upon the floor, said locking device being constructed to engage, at an intermediate point of its length, with the rear edge of the pan, substantially as and for the purposes described.

3. In a dust-pan, the combination with a hanger, and a pan hung thereto, of a locking-piece pivoted on the hanger in a manner to have its movement in a direction away from the pan limited by the hanger and thereby held to lie in the path of the rear side of the pan, and said locking-piece constructed with a rearwardly-extended foot $g$ adapted to rest on the floor, substantially as and for the purposes described.

4. In a dust-pan, the combination with a hanger having a shank and a pan hung to said hanger, of a notched locking-piece pivoted to said hanger and provided at one end with a loop which engages with the shank of the hanger to limit the movement of the locking-piece, the other end of which is provided with a rearwardly-extending foot $g$, substantially as described.

5. In a dust-pan, the hanger A made from a single length of wire which is bent to form the bail, a shank, the inclined feet, and the inwardly-extending trunnions, combined with a pan mounted eccentrically on the trunnions, a staff attached to the shank, and a notched locking-piece which is pivotally mounted on the bail and is provided at one end with a loop $e$ and at its other end with a foot $g$, substantially as described.

In testimony whereof I affix my signature in presence of two witnesses.

SYLVANUS T. PERCY.

Witnesses:
THOMAS TRELEAVEN,
ANGUS G. MACKAY.